F. A. REILEY.
DITCHING PLOW.
APPLICATION FILED JAN. 13, 1920.
1,356,310.
Patented Oct. 19, 1920.
2 SHEETS—SHEET 1.
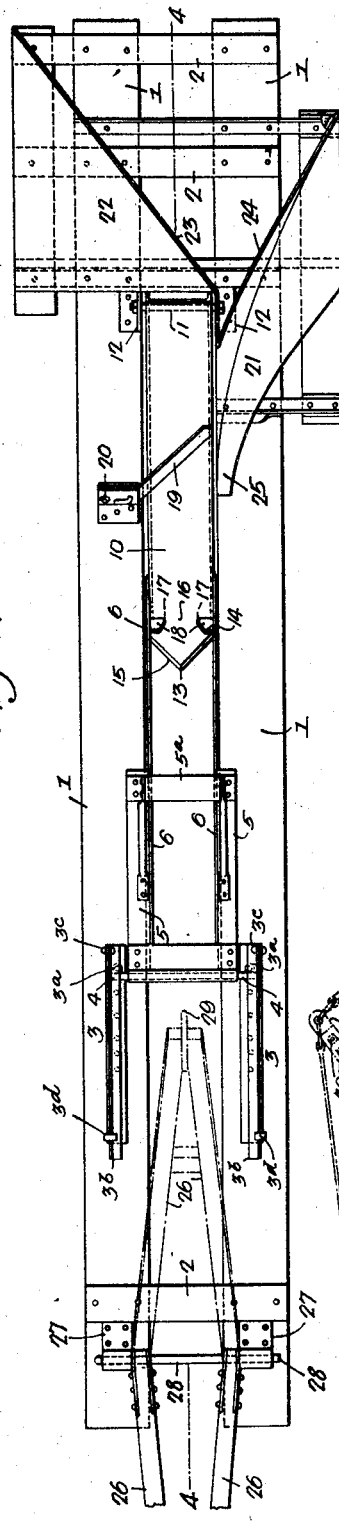
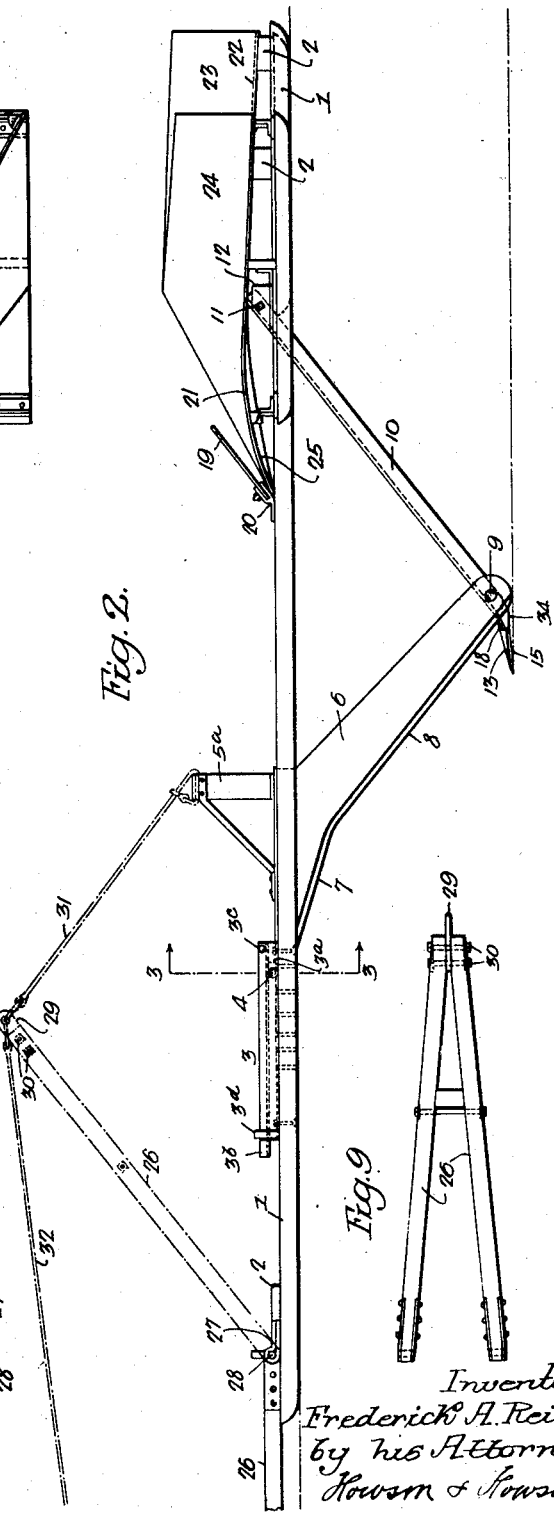
Inventor—
Frederick A. Reiley.
by his Attorneys.
Howson & Howson

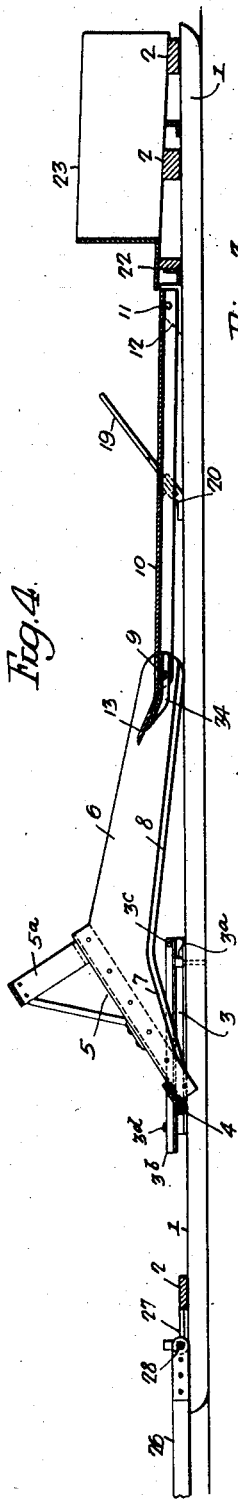

UNITED STATES PATENT OFFICE.

FREDERICK A. REILEY, OF ATLANTIC CITY, NEW JERSEY.

DITCHING-PLOW.

1,356,310.             Specification of Letters Patent.      Patented Oct. 19, 1920.

Application filed January 13, 1920. Serial No. 351,138.

*To all whom it may concern:*

Be it known that I, FREDERICK A. REILEY, a citizen of the United States, residing in Atlantic City, New Jersey, have invented certain Improvements in Ditching-Plows, of which the following is a specification.

My invention relates to certain improvements in machines for making ditches in comparatively soft ground, such as salt marsh, where a certain depth of mud is located above the sand base. In this type of marsh, there are certain roots of salt grass, scrub, and other rank growth, which must be cut and removed. In mud of this character, there are two distinct layers. In the upper layer will be found tough roots, which are alive, while in the bottom layer are roots which have decayed, or are partially decayed, and they can be cut more readily than those at the surface.

One object of my invention is to provide a machine that will cut with one set of blades the full depth of the ditch.

A further object of the invention is to design the machine so that after the side cutters have made the initial cuts, the plow will lift the entire mass, that has been cut, out of the ditch.

Another object of the invention is to provide means for separating the two layers of mud so that they will be thrown out one layer at one side of the ditch and the other at the opposite side.

Still another object of the invention is to provide means for readily lifting the blades and the plow with the mud, when it is desired to shift the machine from one point to another.

In the accompanying drawings:

Figure 1 is a plan view of my improved ditching machine.

Fig. 2 is a side view;

Fig. 3 is a sectional view on the line 3—3, Fig. 2;

Fig. 4 is a sectional view, on the line 4—4, Fig. 1, showing the plow and the blades raised;

Fig. 5 is a detached perspective view, showing the two side blades and their connections.

Fig. 6 is a perspective view of the end of the plow;

Fig. 7 is a plan view of the blank from which the plow is made;

Fig. 8 is a plan view of the plow point after being cut and formed;

Fig. 9 is a detached view of the A-frame; and

Fig. 10 is an enlarged view of the connection between the plow and blades.

1, 1 are two longitudinal skids forming the support for the plow, which are spaced apart and rest upon the ground on either side of the line of the ditch. These skids are rounded at each end so that they can be pulled over the surface of the ground to any point desired. 2 are planks which connect the two skids at each end. 3 are guideways formed as shown in Fig. 3, with a pivoted upper section $3^b$ and provided with stop pins $3^a$ for the pivot rod 4 which is mounted on the rectangular frame 5, as clearly shown in Fig. 5. This frame has a U-shaped connecting member $5^a$ at the rear shaped so as not to interfere with the cutting action of the blades 6, which depend from the frame 5 at the inner edge of each skid 1. These blades define the width of the ditch to be cut. The blades extend the full depth of the ditch and are sharp on their forward edge, as shown. The upper portion 7 of each blade is inclined at a less degree than the lower portion 8 of each blade. By this means, the blade 7 will readily cut the tough roots at the upper portion of the marshy ground. As the lower roots are not as tough as the upper roots, the portion 8 can be at a greater angle, and, consequently, blades made in this manner will cut the full depth of the ditch in one operation.

The rear end of each blade is connected by pivot pins 9 to the plow 10 made of channel iron, as shown in Fig. 6. This plow is pivoted at 11 to bearings 12 made of angle iron in the present instance and secured to the skids 1. The lower end of the plow is pointed and is shaped as shown at 13, the edges being sharpened and slightly turned down as at 15, the head is cut away at 18 on each side of a neck 16, and there is a space between the shoulders at the back of the point and the forward edges of the blades 6 as shown in Fig. 10 to allow any uncut roots to pass clear of the blades and plow.

I preferably form slots 17 on each side of the neck so that the point can be bent at any angle desired, and the point is preferably reinforced by a short channel section 34. It has been found that the tough roots which are not cut, often block the plow to such an extent that it is almost impossible to drag the machine through the ground, but by my improvement this is overcome as the uncut roots readily pass the plow point and the blades.

The plow lifts the entire mass of dirt between the cutters, and a separate blade 19 is provided, which parts the two layers and guides the upper layer to the inclined chute 21 at one side of the plow, while the lower layer travels to the end of the plow and is directed onto and through the chute 22, which has an inclined guide plate 23 which guides the dirt and mud to one side of the skids and a sufficient distance from the ditch so that it will not fall into the ditch. The chute 21 for the upper layer has an inclined guide 24 which directs the mass of material to the side of the ditch.

In order to lift the blade and the plow out of the ditch, with the sod and mud, I provide an A-frame 26, Fig. 9 which is pivoted to the plates 27 at the forward ends of the skids by a pivot pin 28 as in Fig. 1. A plate 29 is preferably clamped to the small end of the A-frame by bolts 30. The A-frame is used when in the position shown in full lines as a draw yoke for attaching the hauling rope to the skids, and when it is desired to lift the plow and blades out of the ditch the A-frame is turned back to the position shown by dotted lines and a rope 31 is attached to the plate 29 on the A-frame and to the member 5ª of the frame 5, then the rope 32 is attached to the plate 29 and power applied, lifting the plow and blades with the section of mud that has been cut and is still on the plow, to the position shown in Fig. 4.

In order to adjust the plow to cut different depths, I form a series of perforations in each guideway 3, and use the pins 3ª which limit the rearward movement of the frame 5. By placing the pins in certain holes, the plow can be adjusted to any depth desired.

The upper section 3ᵇ of each guide is pivoted at 3ᶜ, and is arranged to pass under a lug 3ᵈ. By this construction, the section 3ᵇ can be shifted, and the frame 5 can be removed from the skids.

It will be seen by the above construction that I make a simple and practical ditching machine which can be used, particularly in forming ditches in salt marshes, the machine cutting the full depth of the mud and the blades penetrating the full depth of the mud, and, in some instances, into the lower body of sand, which underlies the mud.

By making the blades in the manner shown the tough roots at the upper surface of the mud are readily cut, while the mud and lower roots, which are partly decayed, are cut to the entire depth of the ditch to be formed. As there is often a distinct line between the upper and lower layers of mud, these two layers, in many instances, separate on being cut so that one can be directed to one side of the ditching machine and the other on the opposite side, but to insure the separation, I provide a blade which makes a distinct parting of the two layers.

By arranging the blades and plow so that they can be lifted clear of the ground, the machine can be readily transferred from one point to another.

I claim:

1. The combination in a ditching machine, of a frame arranged to rest on the ground; a plow and two blades extending diagonally in front of the plow, each blade having two cutting edges, one at an angle to the other.

2. The combination in a ditching plow, of a frame adapted to rest on the ground; two blades spaced apart the width of the ditch to be cut, said blades being pivotally mounted on the frame; a plow having flanges at each side and pivoted to the frame at the upper end and to the blades at the lower end, one of the upper pivots being movable so that the plow and blades can be elevated clear of the ditch.

3. The combination of a frame adapted to rest on the ground; a frame slidably mounted on the main frame and having two depending blades, one at each side the width of the ditch; a plow having its lower end pivoted to the blades and inclined in a direction opposite to the blades, said plow being connected to the frame at its upper end; and means for raising the plow and blades clear of the ditch.

4. The combination in a ditching machine, of a main frame adapted to rest on the ground; a frame slidably mounted on the main frame and having pivots; guides for the pivots; two blades depending from the main frame, each blade having two cutting edges, one at an angle to the other; and a plow extending diagonally in the opposite direction and arranged to remove the material cut by the blades.

5. The combination in a ditching plow of a main frame adapted to rest on the ground and open at the center; a frame pivotally mounted on the main frame and having two blades depending therefrom and spaced apart to form the ditch, said blades having front cutting edges arranged at an angle; a plow connected to the lower ends of the blades and inclined in a direction opposite to the blades and having an arrow-shaped point.

6. The combination in a ditching plow, of a frame adapted to rest upon the ground; and a channel beam arranged at an angle forming a plow, said beam being secured to the frame at its upper end and having an integral arrow-shaped point at its lower end.

7. The combination in a ditching plow, of a frame adapted to rest upon the ground; blades for cutting the sides of a ditch; a channel beam forming a plow and arranged at an incline; and means for securing the upper end of the beam to the frame, said beam being recessed at each side near the lower end forming a neck and pivoted at the lower end, the recesses at each side forming spaces for the passage of the roots which are not cut by the plow point or blades.

8. The combination of a ditching plow; blades for cutting the sides of a ditch, said blades being inclined; a plow inclined in the opposite direction and extending to the bottom of the ditch to be cut, said plow having an arrow-shaped head with beveled edges and connected to the body of the plow by a reduced neck forming a space; the plow being pivotally connected to the blades; and pivots connecting the plow to the body of the frame of the ditching machine.

9. The combination in a ditching machine, of a main frame; blades for cutting the sides of a ditch; a plow for removing the material cut; means for directing an upper layer of material to one side of the machine and a lower layer of material to the opposite side of the machine.

10. The combination in a ditching machine, of a main frame; blades for cutting the sides of a ditch; a plow for removing the material cut; means for directing an upper layer of material to one side of the machine and a lower layer of material to the opposite side of the machine; and a transverse dividing cutter so located as to separate the upper layer of material from the lower layer.

11. The combination in a ditching machine, of a main frame adapted to rest on the ground and open at the center; a frame slidably mounted on the main frame and having pivots; guides on the main frame for the pivots; blades projecting downwardly at an angle from the second frame; a plow pivotally connected to the lower ends of the blades and pivotally connected at its upper end to the main frame; an A-frame mounted on the main frame; and a rope connecting the second frame with the A-frame so that when power is applied to the A-frame and rope the blades and plow will be raised clear of the ditch, with the cut earth remaining on the plow.

12. The combination in a ditching machine of a main frame; two vertically arranged blades projecting from said frame and spaced apart to cut the sides of a ditch; and a plow, arranged at an angle attached at its upper end to the frame and at its lower end to the blades; the plow having a recess at each side below the attachment to the blades to allow uncut roots to pass the plow.

13. The combination of a skid; guides thereon; a frame mounted on the skid and having a pivot arranged to slide in the guide; a cutting blade carried by the frame, and a plow connected to the blade, the guides having a series of holes therein, and adjustable pins arranged to be placed in the holes to limit the depth of the plow.

14. The combination of a skid; guides thereon; said guides having movable upper sections; a plow pivoted to the skid; a frame mounted on the skid and having lateral pivot pins extending into the guides, and blades depending from the frame and pivoted to the lower end of the plow.

15. The combination of a skid, a frame having cutters; a plow pivoted to the skid and pivoted to the cutters, and a frame pivoted to the forward end of the skid and arranged to act as a draw yoke when in one position and to act as a lever to lift the plow and cutters when in another position.

FREDERICK A. REILEY.